United States Patent
Gaspar et al.

(10) Patent No.: US 11,748,348 B2
(45) Date of Patent: Sep. 5, 2023

(54) PROCESSING COMPLEX DATABASE QUERYS

(71) Applicant: Amadeus S.A.S., Biot (FR)

(72) Inventors: Nuno Miguel Pires Gaspar, Vallauris (FR); Stéphane Rodrigues, Antibes (FR); François-Joseph Mytych, Le Rouret (FR)

(73) Assignee: Amadeus S.A.S., Biot (FR)

( * ) Notice: Subject to any disclaimer, the term of this patent is extended or adjusted under 35 U.S.C. 154(b) by 227 days.

(21) Appl. No.: 17/428,835

(22) PCT Filed: Feb. 13, 2020

(86) PCT No.: PCT/EP2020/053680
§ 371 (c)(1),
(2) Date: Aug. 5, 2021

(87) PCT Pub. No.: WO2020/165304
PCT Pub. Date: Aug. 20, 2020

(65) Prior Publication Data
US 2021/0382894 A1    Dec. 9, 2021

(30) Foreign Application Priority Data

Feb. 14, 2019    (FR) ..................................... 1901483

(51) Int. Cl.
*G06F 16/2453* (2019.01)
*G06F 16/215* (2019.01)
*G06F 16/2455* (2019.01)

(52) U.S. Cl.
CPC ...... *G06F 16/24539* (2019.01); *G06F 16/215* (2019.01); *G06F 16/24542* (2019.01); *G06F 16/24552* (2019.01)

(58) Field of Classification Search
None
See application file for complete search history.

(56) References Cited

U.S. PATENT DOCUMENTS

| 9,235,620 | B2 | 1/2016 | Ciabrini et al. |
| 9,582,536 | B2 | 2/2017 | Legrand et al. |
| 9,826,051 | B2 | 11/2017 | Bersin et al. |
| 9,984,165 | B2 | 5/2018 | Legrand et al. |
| 2009/0234682 | A1 | 9/2009 | Baggett et al. |

(Continued)

FOREIGN PATENT DOCUMENTS

| EP | 2885725 B1 | 6/2015 |
| EP | 2908255 A1 | 8/2015 |

(Continued)

OTHER PUBLICATIONS

European Patent Office, International Search Report and Written Opinion dated Feb. 19, 2020 in International Application No. PCT/EP2020/053680.

(Continued)

*Primary Examiner* — Christopher J Raab
(74) *Attorney, Agent, or Firm* — Thompson Hine LLP

(57) ABSTRACT

Multiple database queries forming a complex database request are processed. A first query and second query are answered by a first response and a second response based on a cache storing cached data. A third query which is related to the second query is answered based on a database storing current corresponding to the cached data. A selected subset of the cached data returned with the second response is validated by corresponding current data stored in the database.

13 Claims, 6 Drawing Sheets

(56) References Cited

U.S. PATENT DOCUMENTS

2010/0017436 A1    1/2010   Wolge
2015/0347410 A1   12/2015   Kim et al.

FOREIGN PATENT DOCUMENTS

| WO | 2014026753 A1 | 2/2014 |
|----|---------------|--------|
| WO | 2015110133 A1 | 7/2015 |
| WO | 2015124275 A1 | 8/2015 |

PROCESSING COMPLEX DATABASE QUERYS

The specification generally relates to database technology, more specifically to a system and method for processing complex database requests which include a plurality of individual database queries.

Various systems for receiving database queries from clients and forwarding or distributing queries to further backend system are known. An example are load processing engines which distribute incoming queries to databases which are less loaded than other databases. Another example are search platforms, as described e.g. by EP 2908255 A1, which respond to queries either on the basis of a cache with pre-collected search results and/or from a primary data source.

An example of a system employing complex database requests including more than one database query is described by WO 2015/110133 A1. Here, a complex database query includes a pricing request from a client, a pricing response back to the client, a book request from the client and a book response back to the client.

There is a need to decrease the response times of such complex database requests without compromising the validity of returned database results.

In this regard, according to one aspect, a method for processing data queries is presented. The method is performed by a database system which comprises a database storing current data which is continuously updated and a cache storing cached data corresponding to at least a subset of the current data stored in the database. The method comprises, at the database system: in response to receiving a first query comprising a first set of search parameters specifying data to be retrieved, returning a first set of cached data in accordance with the first search parameters from the cache; in response to receiving a second query related to the first query, the second query comprising a second set of search parameters specifying data to be retrieved and indicating a selected subset of the returned first set of cached data, returning a second set of cached data in accordance with the second set of search parameters from the cache; in response to receiving a third query related to the second query, the third query comprising a third set of search parameters specifying data to be retrieved indicating a selected subset of the returned second set of cached data, retrieving a third set of current data in accordance with the third set of search parameters from the database, validating the selected subset of the returned second set of cached data with the corresponding current data stored in the database, and returning the retrieved third set of current data in accordance with the third set of search parameters and the validated selected subset of the returned second set of cached data.

In some embodiments, the database system further comprises a frontend module for processing at least the second query and the third query, and the method further comprises, at the frontend module: in response to receiving the second query, directing the second query to the cache for retrieving the second set of cached data; in response to receiving the third query, determining that the third query is related to the previous second request and directing the third query to the database for retrieving the third set of current data and validating the selected subset of the returned second set of cached data.

In some embodiments, the method further comprises, at the frontend module: receiving the second set of cached data from the cache and sending a response message with the second set of cached data to a querying client; receiving the retrieved third set of current data and the validated selected subset of the returned second set of cached data from the database and sending a response message with the retrieved third set of current data and the validated selected subset of the returned second set of cached data to the querying client.

In some embodiments, validating the selected subset of the returned second set of cached data with the corresponding current data stored in the database comprises determining whether the current data stored in the database corresponding to the selected subset of the returned second set of cached data is identical to the selected subset of the returned second set of cached data, and the method further comprises, in response to determining that the current data stored in the database corresponding to the selected subset of the returned second set of cached data is identical to the selected subset of the returned second set of cached data, returning an indicator of validity as the validated selected subset of the returned second set of cached data.

In some embodiments, the method further comprises, in response to determining that the current data stored in the database corresponding to the selected subset of the returned second set of cached data is different from the selected subset of the returned second set of cached data, returning a determined difference between the returned second set of cached data and the current data stored in the database corresponding to the selected subset of the returned second set of cached data as the validated selected subset of the returned second set of cached data.

In some embodiments, the cache and the database store data about a communication network infrastructure including network nodes of the communication network, links between the nodes of the communication network and technical information about the nodes of the communication network and the links between the nodes of the communication network, and wherein the first, second and third query are part of a network routing request. The first set of search parameters of the first query specify network node characteristics of a potential target network node to communicate with and the first set of cached data comprises identification information and characteristics information of a number of network nodes fulfilling the specified network characteristics. The second set of search parameters of the second query comprises an identification of a selected target network node of the number of network nodes and the second set of cached data comprises identification information and technical information about a number of forward network routes from the source network node to the selected target network via the links between the nodes of the communication network. The third set of search parameters comprises an identification of a selected forward network route of the number of forward network routes from the source network node to the selected target network via the links between the nodes of the communication network and the third set of current data comprises identification information and technical information about a number of reverse network routes from the target network node to the source network node via the links between the nodes of the communication network.

According to a further aspect, a database system for processing data queries is presented. The database system comprises a database storing current data which is continuously updated, a cache storing cached data corresponding to at least a subset of the current data stored in the database, at least one processor; and at least one memory containing instructions that, when executed by the at least one processor, cause the database system to perform operations. The operations comprise: in response to receiving a first query comprising a first set of search parameters specifying data to be retrieved, return a first set of cached data in accordance with the first search parameters from the cache; in response to receiving a second query related to the first query, the second query comprising a second set of search parameters specifying data to be retrieved and indicating a selected subset of the returned first set of cached data, return a second set of cached data in accordance with the second set of search parameters from the cache, in response to receiving a third query related to the second query, the third query comprising a third set of search parameters specifying data to be retrieved indicating a selected subset of the returned second set of cached data, retrieve a third set of current data in accordance with the third set of search parameters from the database, validate the selected subset of the returned second set of cached data with the corresponding current data stored in the database, and return the retrieved third set of current data in accordance with the third set of search parameters and the validated selected subset of the returned second set of cached data.

Further, in some embodiments, the operations comprise any one of the further optional method aspects mentioned above.

According to still another aspect, a computer program product is presented which comprises program code instructions stored on a computer readable medium to execute the method according to any one of the aspects mentioned above when said program is executed on a computer.

Embodiments are described with reference to the following figures, in which.

Figure 3:
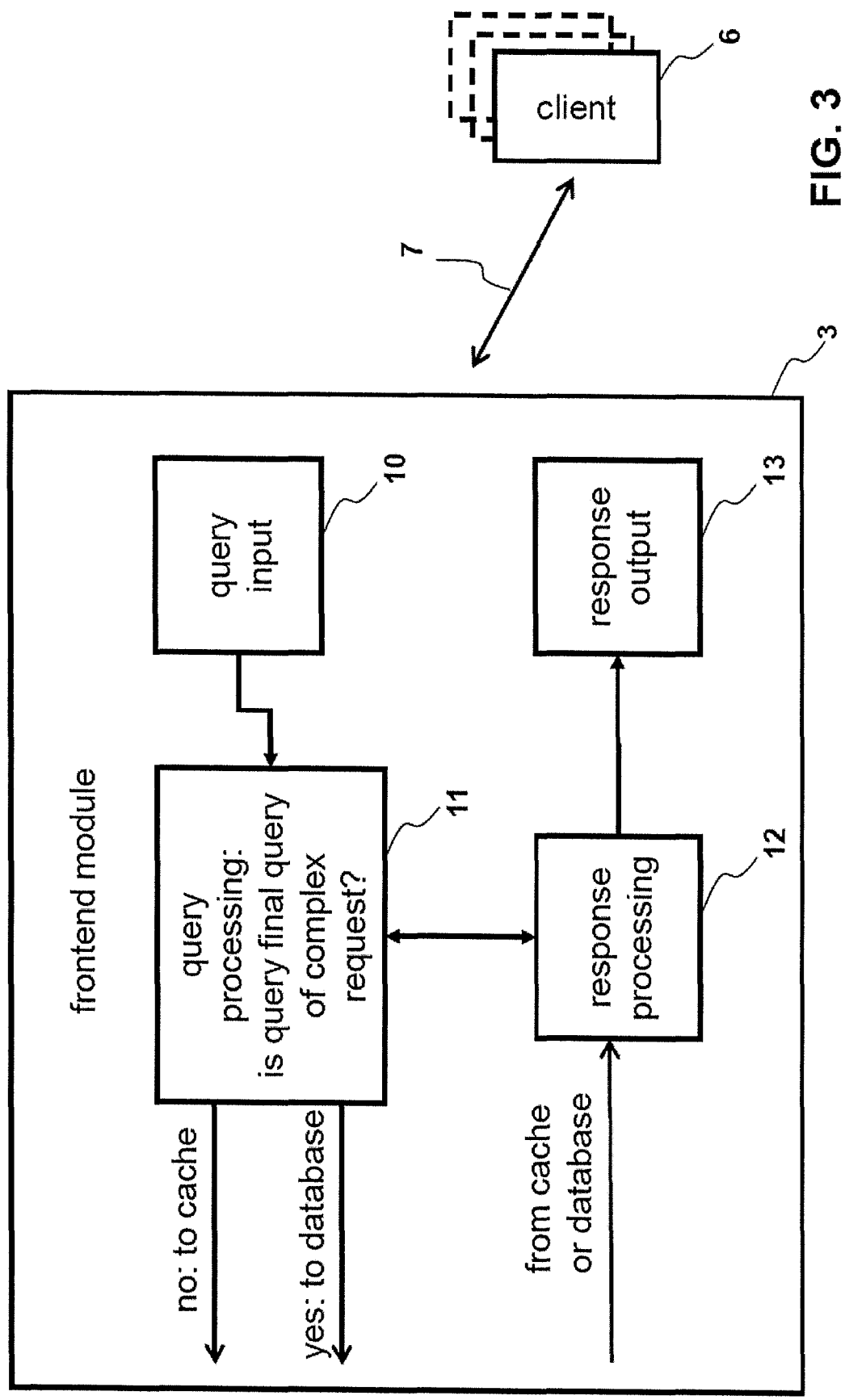

FIG. 3 visualizes a functional structure of a frontend module as described herein.

Figure 2:
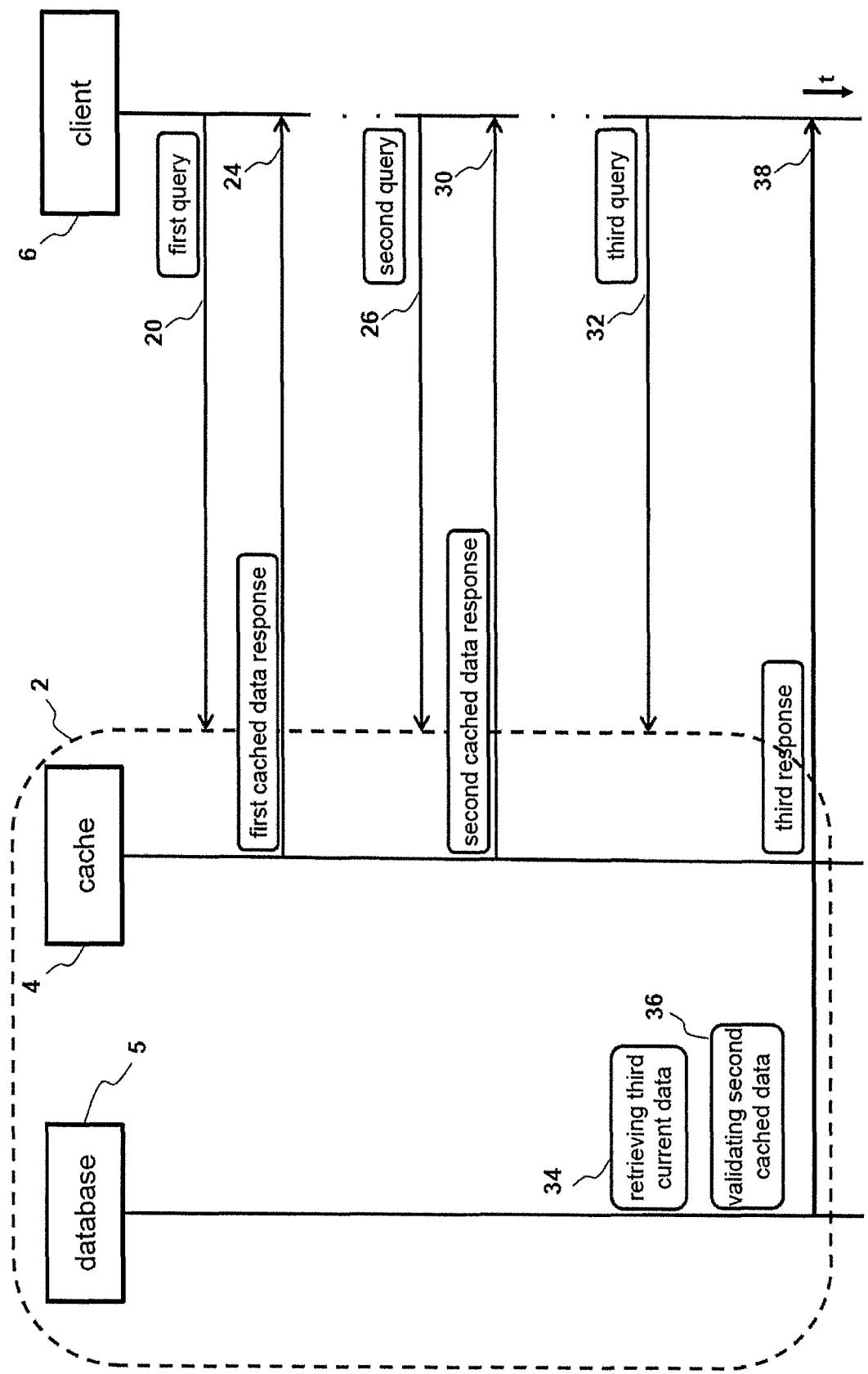
FIG. 2 shows a message sequence of a complex database request.
Figure 4:
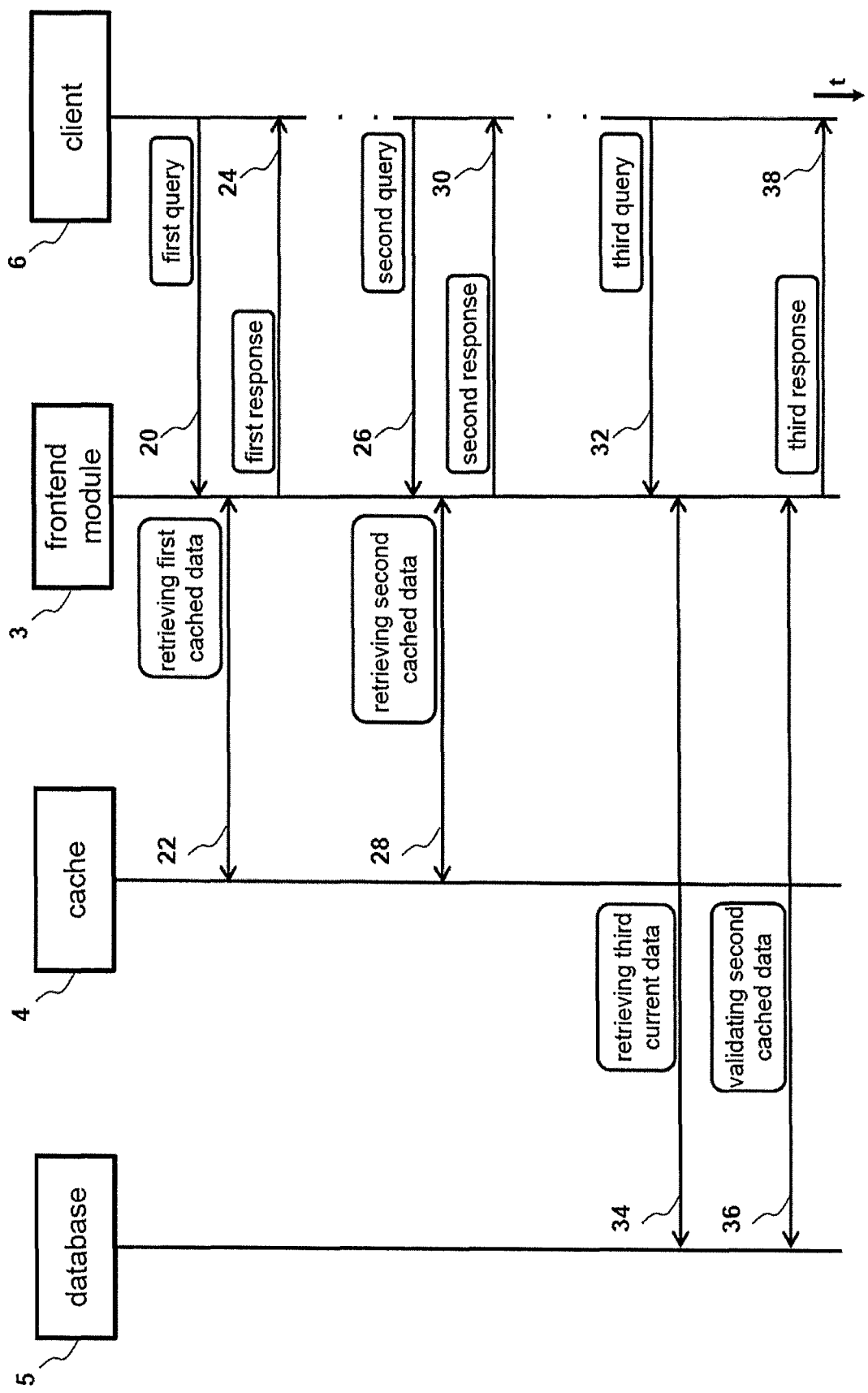

FIG. 4 depicts a refined version of the message sequence of FIG. 2.

Figure 5:
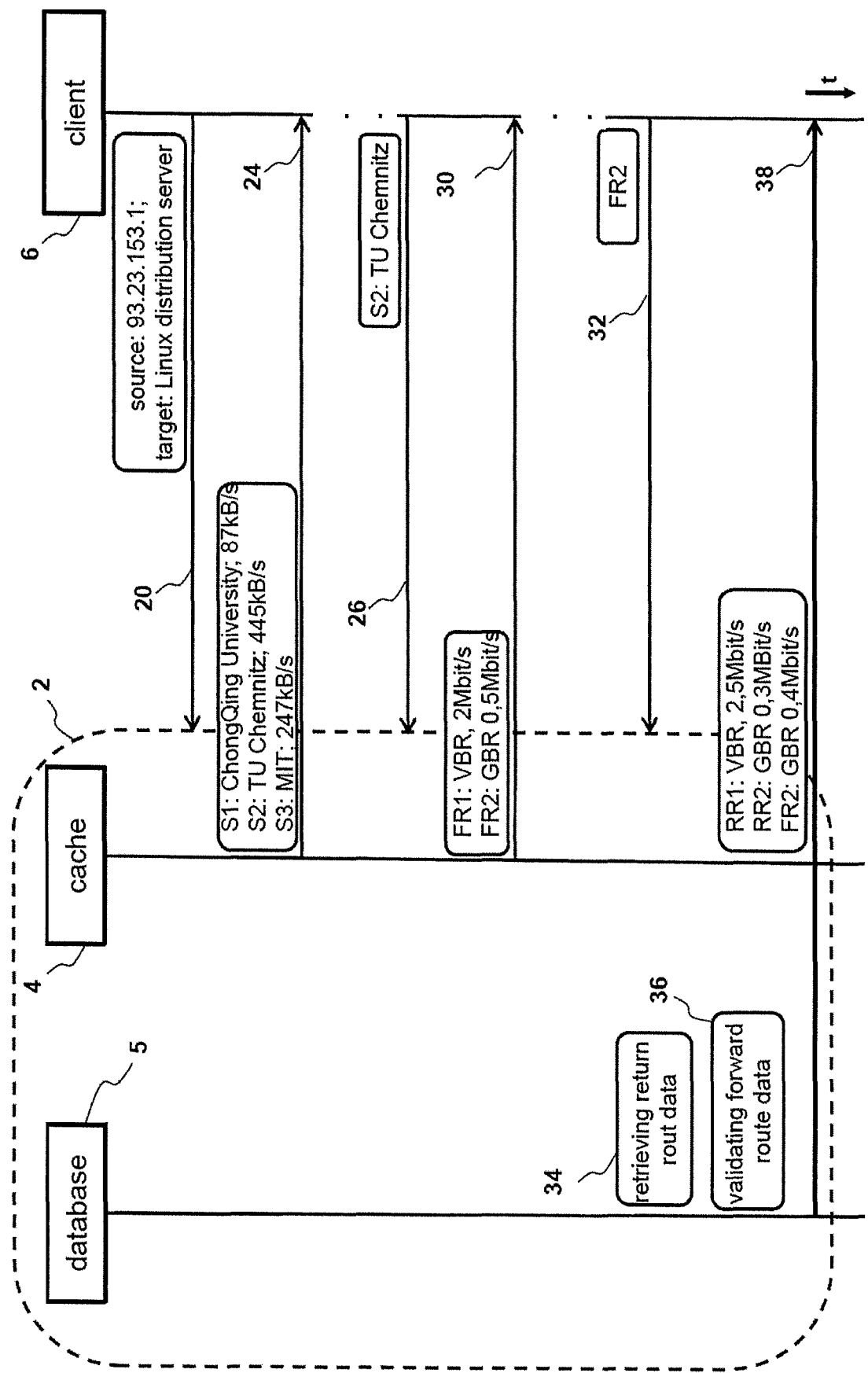

FIG. 5 illustrates a network routing use-case of the methodologies described herein.

Figure 6:
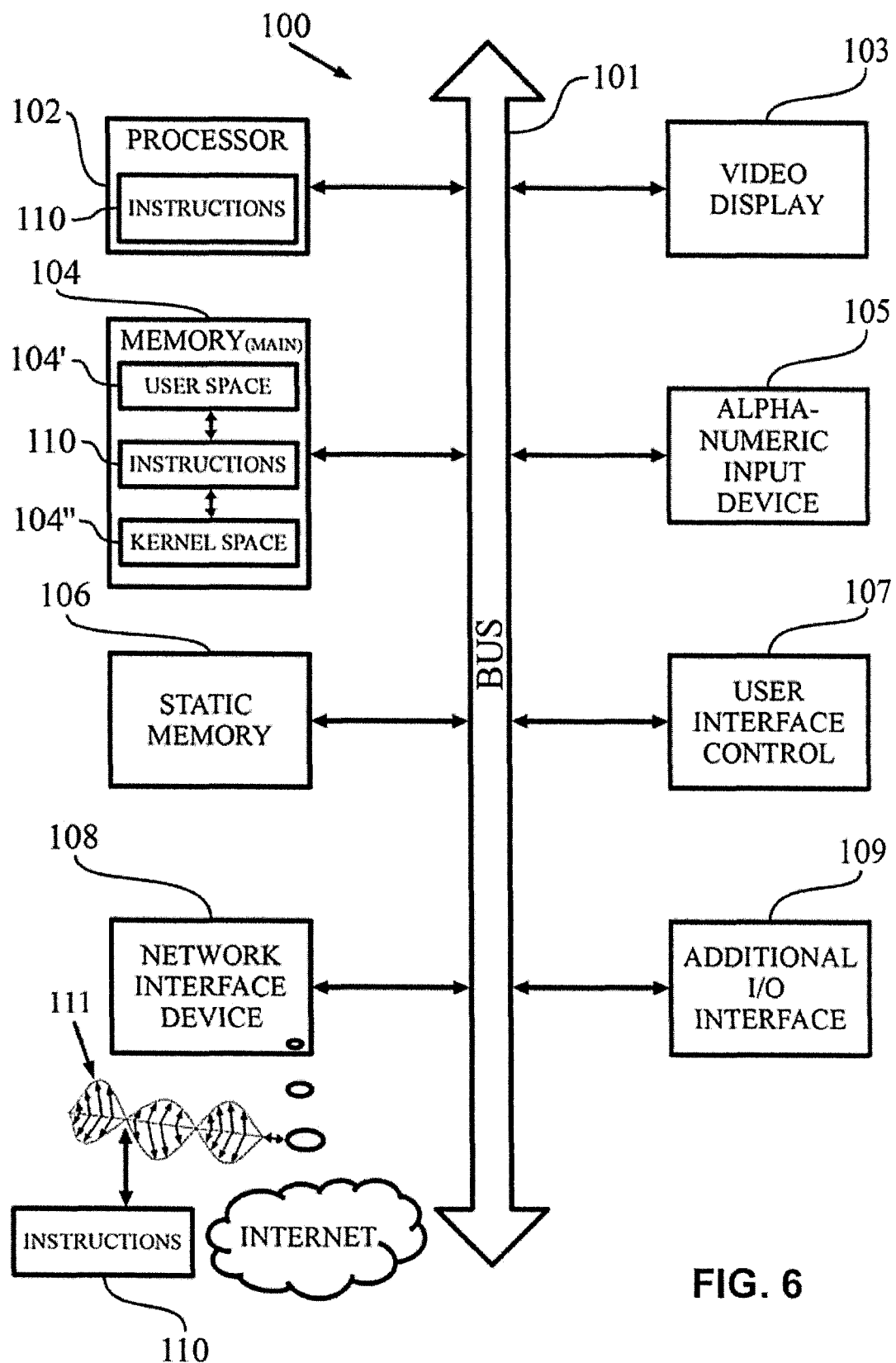

FIG. 6 shows an internal assembly of a computer machine implementing the functionality described herein.

Figure 1:
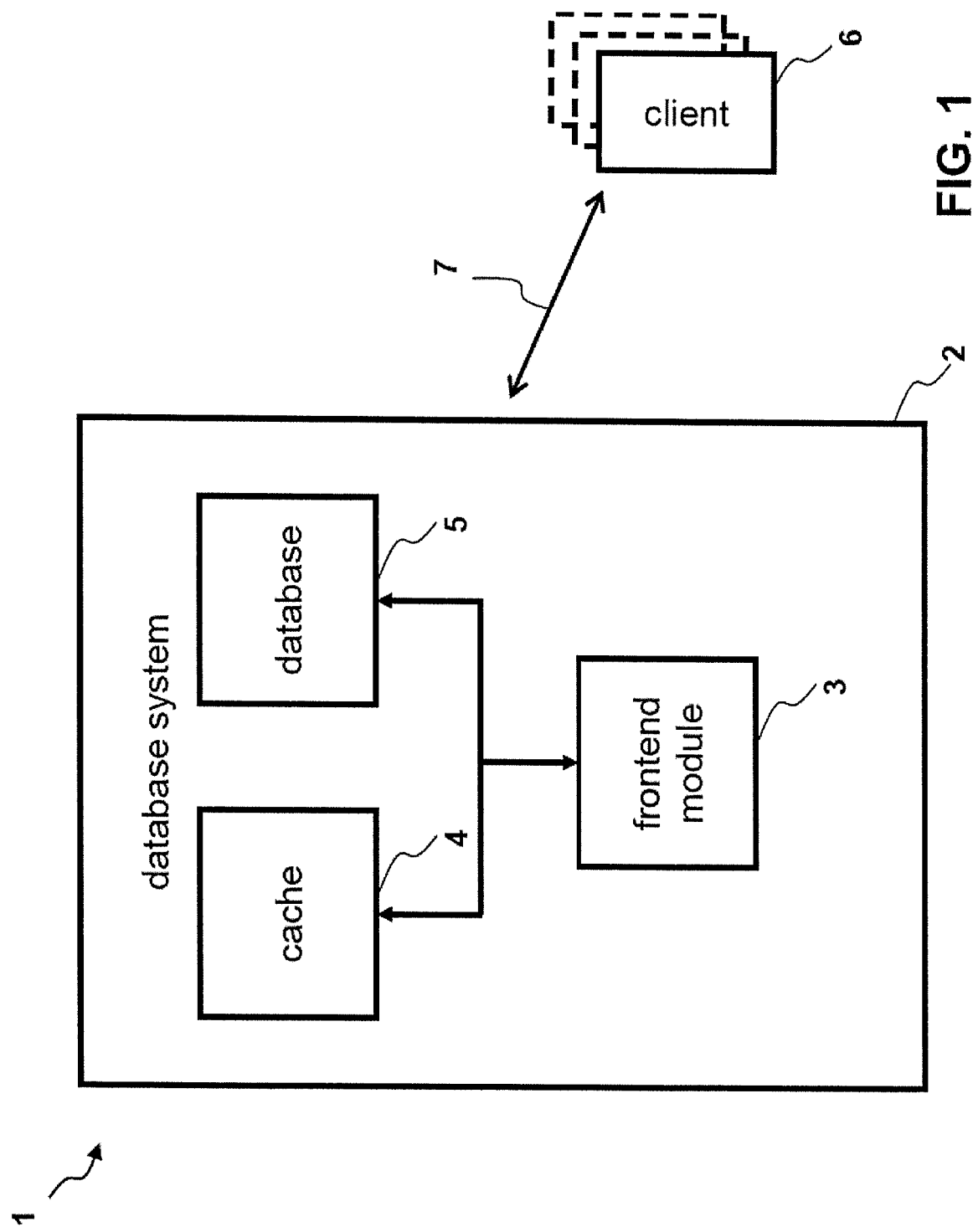
FIG. 1 depicts a database system according to the aspects presented herein.

The present mechanisms to process data queries relate to a communication system 1 with a database system 2. A schematic example is shown in FIG. 1. The database system 2 includes at least a database 5 storing current data which is continuously updated and a cache 4 storing cached data corresponding to at least a subset of the current data stored in the database 5. The term "database" is meant to encompass any types of structured information storage system such as standard stand-alone databases like SQL Server® (SQL=Structured Query Language) or Oracle® databases as well as more complex, distributed and/or proprietary storage systems (e.g. Cloudera® or MapR® or HortonWorks® Hadoop, Spark, Hive, Apache Hadoop® Distributed File System (HDFS), etc.), relational databases including database management systems or object-oriented databases and the like. The database 5 utilizes processing and memory resources to process and respond to database queries and store data. The database 5 may be executed by one or more computing machines.

The cache 4 may be implemented as a further database (in addition to the database 5) on other and/or the same computing machine(s) as the database 5. In some embodiments, the cache 4 may also be a logical cache, i.e. the data of the cache 4 is held in respectively assigned areas of a memory of the hardware machine(s) which host(s) the database 5.

The database 5 stores data which is generally up-to-date and, thus, forms original or valid data. To this end, the database 5 may be equipped with an interface to update the data stored in the database 5. This interface may be the same as the interface to receive and respond to database queries. The data stored by the database 5 is continuously kept updated which means that any change of the data is actually effected in the database 5, e.g. on an event-based or periodic basis. Hence, the database 5 is either an original data source itself, such as an inventory database or a database maintaining any kind of original and generally valid results, or accesses one or more original data sources in order to store original results in identical (mirror) or processed form. Examples of the latter kind are a search engine accessing Internet websites and a computation platform computing priced travel recommendations based on fares stored in a fare database. If the database 5 generates/computes/collects the original results by accessing other/further original data sources in order to prepare original results, the database 5 provides results which generally accurately reflect the current content of the original response data.

On the other hand, the cache 4 stores cached data corresponding to at least a subset of the data stored in the database 5. In other words, the cache 4 maintains a pool of results which have been processed via the database 5 or is e.g. a server holding a repository of the content of crawled websites, or the second platform 4 is e.g. a search platform maintaining pre-computed priced travel recommendations, as described e.g. by WO 2014/026753 A1.

In general, the database 5 providing original response data and the cache 4 maintaining the cached results differ from each other in technical terms as follows: The cache 4 provides a cheaper (in terms of computation costs) faster access (in terms of response times) to the results compared to the database 5. This relation between the database 5 and the cache 4 can also be expressed the other way around, i.e. the database 5 generally responds more slowly and responses from the database 5 involve higher computation costs than responses from the cache 4 e.g. because the database 5 still has to calculate results at query time (e.g. retrieve the requested content from the original Internet website, or compute the requested priced travel recommendations on the basis of fares kept in a fare database). As the computation resources of the database 5 are limited, the number of accesses to the database 5 should be kept within a certain limit. For example, CPU consumption (CPU=central processing unit) or memory load of the database 5 should not exceed a given limit.

On the other hand, however, the cached data stored in the cache 4 are not necessarily perfectly synchronized with the original results provided by the database 5. In general, the cached data of the cache 4 represent older versions of original results being provided by the database 5 and the respective version of the original result provided by the database 5 might have changed since the last update of the corresponding cached data maintained in the cache 4. Furthermore, the cache 4 does not necessarily store prepared results corresponding to all existing original results, i.e. data might be missing in the cache 4.

Thus, the technical problem arises to minimize response times for database requests while not compromising the accuracy and validity of the data returned.

The database environment 1 is further coupled to at least one, but generally a plurality of clients 6. Clients 6 such as applications on user terminals retrieve results from the database environment 1 by directing data requests to the database environment 1 via an interface 7. The technical characteristics of the interface 7 depend on the particular implementation of the database environment 1. For example, the interface 7 encompasses wireless communication including 2G/3G/4G (including packet-oriented mobile data exchange as well as SMS, Short Message Service) and/or Wi-Fi communication in the case the client 6 is situated on a mobile communications device. Alternatively or in addition, the interface 7 features wired communication using standard network protocols employed in local area networks and/or wide area networks including the Internet such Ethernet, TCP/IP (Transmission Control Protocol/Internet Protocol), SMTP (Simple Mail Transfer Protocol) with POP3 (Post Office Protocol) or IMAP (Internet Message Access Protocol), HTTP (Hypertext Transfer Protocol), webservice-related protocols such as SOAP (Simple Object Access Protocol), etc.

A sequence of individual messages constituting a complex database request is shown by FIG. 2. The term "database request" is used herein as a general term for a logical data retrieval from the database system 2. The present mechanisms are specifically related to complex database request according to which a data retrieval from the database system 2 includes two, three or more subsequent individual database queries sent from a data-requesting client 6 and received at the database system 2. These multiple database queries constituting a complex database request may be any types of transactional queries, requests for batch computations, SQL queries, and other forms. Generally, in response to receiving a database query, the database system 2 processes the database query, looks up the cache 4 and/or the database 5 and returns a database response to the requesting client 6.

More specifically, with reference to FIG. 2, the database system 2 receives a first query 20 from the client 6. For example, the database system 2 stores travel data for retrieval and booking, such as pre-computed priced travel recommendations, as described e.g. by WO 2015/124275, with outward and return data in the cache 4 and current outward and return data in the database 5. In this example, the first query 20 requests a list of priced travel recommendations from an originating location to a destination location within a certain time window (e.g. a travel from Nice to Munich with outward journey on day X and return journey on day X+6 or X+7). Accordingly, the first query 20 includes a first set of search parameters specifying the features of the priced travel recommendations sought. In response to receiving the first query 20, the database system 2 processes the first query 20 and recognizes that this is the first query of a complex database request which is to be answered on the basis of the cache 4. Thus, the database system 2 retrieves the data specified by the first set of search parameters included in the first query 20 from the cache and returns, by means of a first cached data response 24, the retrieved data as a first set of cached data which are in accordance with the first search parameters from the cache 4. In the given example, the returned first set of cached data is a list of e.g. 10 priced travel recommendations fulfilling the search parameters in the first query 20.

As the cached data returned by the first response 24 originates from the cache 4, there is a likelihood that the cached data is outdated and, thus, inconsistent to the current data stored in the database 5. On the other hand, by utilizing the cache 4, the first response 24 is returned faster than a hypothetical response based on the database 5 and, thus, the response time for the first query 20 is reduced.

The client 6, after having received the first cached data response 24, may present the received response data to the user and the user may select one or more of the first set of cached data. In the given example, the user may select one of the priced travel recommendations. The selection may also be taken in an automatic manner without any user interaction. The selection at the client 6 then triggers the next database query, namely the second query 26.

The second query 26 comprises a second set of search parameters specifying data to be retrieved and indicating a selected subset of the returned first set of cached data. In the given example, the second query 26 contains parameters identifying the one or more priced travel recommendations selected at the client 6 and e.g. constitutes an availability query for the outward journey of the selected priced travel recommendation. Thus, the second query 26 is related to the first query 20 as, in the example given, the second query 26 refers to at least a subset of the data retrieved by means of the first query 20.

In response to receiving the second query 26, the database system 2 likewise processes the second query 26, and recognizes that this is the second query of the complex database request which is again to be answered on the basis of the cache 4. Thus, the database system 2 retrieves the data specified by the second set of search parameters included in the second query 26 from the cache 4 and returns, by means of a second cached data response 30, the retrieved data as a second set of cached data which are in accordance with the second search parameters from the cache 4. In the given example, the returned second set of cached data is e.g. an availability indication about the outward journey of the selected priced travel recommendation, potentially accompanied with further information such as booking class options and associated prices.

Again, as the cached data returned by the second response 30 originates from the cache 4, there is a likelihood that the cached data is outdated and, thus, inconsistent to the current data stored in the database 5. On the other hand, by utilizing the cache 4, the second response 30 is returned faster than a hypothetical response based on the database 5 and, thus, the response time for the second query 20 is reduced as well.

Similar to the reception of the first cached data response 24, the client 6 processes the received second cached data response 30 and e.g. displays the results to the user. Again, the user may make a selection, such as a confirmation or, if several alternatives are given, choose one of the alternatives. For example, if more than one booking classes is indicated by the second cached data response 30, the user may select one. Again, the selection may also be performed in an automated manner. The selection at the client 6 then triggers the next database query, namely the third query 32.

The third query 32 comprises third set of search parameters specifying data to be retrieved indicating a selected subset of the returned second set of cached data. In the given example, the third query 32 contains parameters identifying the confirmed or selected booking class option at the client 6 and e.g. constitutes an availability query for the return journey of the selected priced travel recommendation. Thus, the third query 32 is related to the second query 26 (and, thus, indirectly also to the first query 20) as, in the example given, the third query 32 refers to at least a subset of the data retrieved by means of the second query 26.

In response to receiving the third query 32, the database system 2 likewise processes the third query 32, and recognizes that this is the third query of the complex database request which is to be answered on the basis of the database 5, i.e. on the basis of the current data stored in the database 5. Thus, the database system 2 retrieves 34 the data specified by the third set of search parameters included in the third query 32 from the database 5 and returns, by means of a third response 38, the retrieved data as a third set of data, namely current data from the database 5, which are in accordance with the third search parameters. In the given example, the returned third set of current data is e.g. an availability indication about the return journey of the selected priced travel recommendation, potentially accompanied with further information such as booking class options and associated prices.

As the third set of data returned by the third response 38 originates from the database, it is ensured that the data is valid. This is particularly beneficial if the third response is the final response of the complex database request. On the other hand, by now utilizing the database 5, the third response 38 takes more time than a hypothetical response based on the cache 5.

As a synergetic measure, the retrieval of the third set of data from the database 5 is accompanied by a validation 36 of the selected subset of the returned second set of cached data which is identified by the third set of search parameters. To this end, the selected subset of the second set of cached data is compared with the corresponding current data stored in the database 5. If both sets of data are identical, the selected subset of the second set of cached data which was returned to the client with the second response 30 was valid and the database system 2 does not need to take any further action (a confirmation of the positive outcome of the validation might be included in the third response 38, though).

If, on the other hand, the comparison yields a difference between selected subset of the second set of cached data with the corresponding current data stored in the database, then the selected subset of the second set of cached data which was returned to the client with the second response 30 was invalid (or at least, is invalid at the current point of time, as a data update may have occurred only recently in the period after the second response 30 was returned) and the updated (i.e. current) version of the selected subset of the second set of cached data as stored in the database 5 is retrieved from the database 2 and returned to the client 6 with the third response 38 as a validated selected subset of the returned second set of cached data. Returning the validated selected subset of the returned second set of cached data may be effected in different forms, such as returning the complete updated (i.e. current) version of the selected subset of the second set of cached data as stored in the database 5 or only returning the difference between the complete updated version of the selected subset of the second set of cached data as stored in the database 5 and the previously returned subset of the second set of cached data.

In this way, the look-up of the database 5 in response to receipt of the third query 32, which is comparably slower than a look-up of the cache 4, is utilized to not only ensure validity of the third set of return data, but also validity of the portion of the second set of the data previously returned based on the cache 4 which was selected at the client 6 after transmission of the second response 30. Compared with an alternative way which also ensures validity of both sets of return data, namely already retrieving the second data requested by the second query 26 from the database 5, the overall response time of the complex database request comprising all three responses 24, 30, 38 is reduced. Moreover, validating 36 the selected subset of the returned second set of cached data which is identified by the third set of search parameters has a further technical advantage because this validation 36 is implemented by a more specific database query to the database 5 compared with a hypothetical database query to retrieve the overall response data to the second query 26 from the database 5. This more specific validation query to the database 5 thus saves computation resources of the database 5 also in this respect.

Referring back to FIG. 1, in some embodiments, the database system 2 further comprises a frontend module for processing at least the second query and the third query. In these embodiments, database queries issued by a client 6 are received by a further entity of the database system 2, the frontend module 3 (FIG. 1). In general, the frontend module 3 processes incoming database queries in order to decide whether response data are retrieved from the database 5 and/or from the cache 4. To this end, the frontend module 3 functions as an intermediate unit controlling the data flow within the database system 2 and the response data to be returned to the requesting client 6.

An internal functional structure of the frontend module 3 according to some embodiments is shown by FIG. 3. Database queries arriving from a client 6 over the communication interface 7 are received at query input module 10. Query input module 10 may implement standardized communication protocols across the layers of the OSI reference model as exemplarily listed already above. Amongst others, the query input module 10 may employ initial processing mechanisms such as error recognitions and corrections, packet assembly, as well as determination whether a valid database query has been received. Invalid messages may be discarded already by the query input module 10 for reasons of security and performance.

Valid database queries are relayed from the query input module 10 to the query processing module 11. The query processing module 11 processes received queries at a substantive level, i.e. examines received queries in order to determine whether a query is to be responded based on the cache 4 or based on the database 5. To this end, in some embodiments, the query processing module 11 checks whether a received query is the first, second etc. query of a complex database request or whether a received query is the third or final query of a complex database request.

As a general rule, in response to determining that a received query is a final query of a complex database request, this received query is responded on the basis of the database 5 and previously received queries of the same complex database request (more specifically: cached result returned in response to previously received queries of the complex database request) may be validated utilizing the database 5. Non-final queries of complex database requests are responded based on the cache 4. Hence, the query processing module 11 directs non-final queries to the cache 4 and final queries to the database 5.

The recognition of the query processing module 11 whether or not a received database query is a final of a complex database request may be taken in various ways which depend on the implementation of the protocol of the complex database requests. For example, database queries belonging to a certain complex database query may carry a unique (or pseudo-unique) identifier of the complex database request as well as a query number. In other examples, database queries may include a query type field indicating the type of the query (e.g. first, second or third query) and the query processing module 11 maintains context data for each received and processed query. In these examples, the query processing module 11 is able to determine the relation of a subsequent query to a previously received query and, thus, identify the complex database request of the received subsequent query, based on the stored context data and the information included in the subsequent query (e.g. the second set of search parameters indicating a selected subset of the returned first set of cached data, as explained above).

In some embodiments, the interface 7 between the frontend module 3 and the clients 6 may employ a different database platform (e.g. query language, a certain database standard) than employed internally in the database system 2 by the cache 4 and/or the database 5. For example, the latter ones might be based on a proprietary implementation while the external interface 7 might be based on a standardized implementation. Further, even the cache 4 and the database 5 may employ different database query technologies. In such embodiments, directing queries to the cache 4 or to the database 5 by the query processing module 11 may also comprise transforming or converting the received queries into other forms of database queries (which may be referred to as database-system-internal queries) in accordance with the database implementation of the cache 4 and the database 5. Utilizing the frontend module 3 is beneficial in such setups as this provides a uniform and, thus, simplified database protocol vis-à-vis the clients 6 (compared to the clients 6 accessing the database 5 and the cache 4 directly).

The query processing module 11 also realizes the validation of previously returned cached results with current data stored in the database 5. Hence, in response to determining that a received query is the final query of a pending complex request, the query processing module 11 may also generate a validation query for validating previously returned cached data and directs the validation query to the database 5. The previously returned cached data to be validated is identified by the received query, possibly in combination with the stored context data. For example, the received query may include one or more identifiers (e.g. keys) identifying the selected subset of previously returned cached data, the latter one being stored as part of the context data.

With continued reference to FIG. 3, responses from the cache 4 and from the database 5 are received by a further component of the frontend module, the response processing module 12. Generally, the response processing module 12 performs inverse actions of the query processing module 11, such as converting back cache and database responses to the formats and/or message flows employed on the communication interface 7 and associating the responses with the superordinate complex database request, e.g. by including a corresponding identifier into the response to the client 6, as mentioned above. The association function may also make use of context data stored by the query processing module. Further, the response processing module 12 may also update or augment the context data stored by the query processing module 11, e.g. by adding information about the response data to be returned to the client with the present response. To this end, in some embodiments, the response processing module 12 has a functional connection to the query processing module 11. This connection may, for example, be realized by a storage internal in or external to the frontend module 3 in which both modules 11, 12 access the context data specifying the current status of pending complex database requests. Other entities outside the frontend module 3 may access this context data storage as well.

Responses processed by the response processing module 12 are then relayed to the response output module 13 which is responsible for sending the responses to the requesting client 6. Generally, the response output module 13 performs inverse actions of the query input module 10, i.e., for example, receiving response data from the output module 13 and implementing OSI layer communication protocols in order to send the responses back to the requesting client 6.

Note that, in some embodiments, not all queries from clients 6 directed to the database system 2 need to be processed by the frontend module 3. Other interfaces between the clients 6 and the cache 4 and/or the database 5 may be present which allow the clients 6 to access the cache 4 and/or the database 5 bypassing the frontend module 3, e.g. for stand-alone database queries outside the complex database requests. In some embodiments, such stand-alone database queries not being part of a complex database request may also be processed by the frontend module 3. In these embodiments, the frontend module 3 is able to recognize that a received query does not relate to a complex database request and is equipped with logic depending on the use-case to direct such stand-alone query either to the cache 4 or to the database 5 (for example, in a manner as taught by EP 2908255 A1).

FIG. 4 shows a refined version of the message sequence of FIG. 2 by additionally referring to the relaying and processing functions of the frontend module 3. The explanations above made with reference to FIG. 2 also apply to FIG. 4. At this more specific level of FIG. 4, however, the sequence further comprises, receiving the first query 20 at the frontend module 3 and the frontend module 3 retrieving 22 the first cached data from the cache 4. The frontend module 3 also sends back the first response 24 to the requesting client 6, e.g. in the manner as explained above with reference to the example of FIG. 3.

Further, in a similar manner, in response to receiving the second query 26, the frontend module 3 directs the second query 26 to the cache 4 for retrieving 28 the second set of cached data. Likewise, the frontend module 3 sends the second response 30 to the client 6. Further, in response to receiving the third query 32, the frontend module 3 determines that the third query 32 is related to the previous second query 26, and e.g. that the third query is the final query of the complex database request comprising at least the second query 26 and the third query 32, and directs the third query 32 to the database 5 for retrieving 34 the third set of current data and validating 36 the selected subset of the returned second set of cached data. The frontend module 3 then sends the third response 38 with the third set of current data and the validated selected subset of the returned second set of cached data back to the client 6.

The methodologies described above can be employed for various use-cases. One application is the technical domain of network routing where a routing decision is made by way of requesting routing data from a routing server. In such exemplary application, the routing server includes the cache 4 and the database 5 which store data about a communication network infrastructure including network nodes of the communication network, links between the nodes of the communication network and technical information about the nodes of the communication network and the links between the nodes of the communication network. The first, second and third query mentioned above are part of a complex network routing request.

The first set of search parameters of the first query specify, for example, a source network node and network node characteristics of a potential target network node to communicate with and the first set of cached data comprises identification information and characteristics information of a number of network nodes fulfilling the specified network characteristics. The second set of search parameters of the second query comprises an identification of a selected target network node of the number of network nodes and the second set of cached data comprises identification information and technical information about a number of forward network routes from the source network node to the selected target network via the links between the nodes of the communication network. The third set of search parameters comprises an identification of a selected forward network route of the number of forward network routes from the source network node to the selected target network via the links between the nodes of the communication network and the third set of current data comprises identification information and technical information about a number of reverse network routes from the target network node to the source network node via the links between the nodes of the communication network.

A more specific (and for reasons of presentation simplified) example of this use-case is illustrated by FIG. 5. Here, the database 5 stores current data about all sorts of mirror servers including mirror servers specifically storing Linux operating system distribution packages which can be accessed via the Internet. The mirror servers form the set of potential target network nodes, while routers and gateways of the Internet form further network nodes that are interconnected by network links. The data stored by the database 5 may comprise an identifier, a name, a URL (uniform resource locator) and quality-of-service data such as data rates, number of parallel up-/downloads, etc. of the mirror servers. The cache 4 may store a part, an aggregated version of a part, or all of the current data of the database 5 and may be updated periodically, such as once a day.

To make a routing decision for uploading and or downloading Linux distribution data to a mirror server, the client 6 makes a complex database request to the database system 2 (here: the routing server) which includes at least three database queries, similar to what has been described above. With the first query 20, the client 6 indicates a source node by including its own IP address 93.23.153.1 in the query. Further, the first query 20 includes an indication of a characteristic of the routing target, namely that a Linux distribution mirror server is sought.

The first query 20 (and the other subsequent queries) are processed and responded to by the database system 2 in the manner as described above. More specifically, the first query 20 is answered based on the cache 4 and the first response 24 indicates three servers fulfilling the search parameters of the first query 20, e.g. server S1 of the ChongQing University, China, S2 hosted by the Technical University Chemnitz, Germany and server S3 located with the Massachusetts Institute of Technology in Cambridge, USA. The first response 24 further indicates respective technical details for the mirror servers, such as a data rate (e.g. average over 24 hours) for the communication with the server.

After a selection at the client 6, one of the mirror servers is returned with the second query 26 (in the example, S2: TU Chemnitz), i.e. one of the target network nodes has been determined by the client 6. As mentioned above, the selection may be made manually by a user or automatically e.g. by a default mechanism (here: select the server with the highest data rate).

The database system 2 then returns a cache-based second response 30 indicating quality-of-service parameters for multiple forward routes (FR) though the network, e.g. a variable bit rate (VBR) service with up to 2 Mbit/s for a first forward route (FR1) and a guaranteed bit rate service with a guaranteed transmission rate of 0.5 Mbit/s for a second forward route (FR2). Again, a selection of one of the routes is taken at the client and transmitted back to the database system 2 with the third response 32. In the given example, the second forward route FR2 was selected.

The database system 2 then returns the third response 38 based on the current data stored in the database. On the one hand, the third response 38 includes a list of return routes with respective quality-of-service indications, namely a VBR service of up to 2.5 Mbit/s for a first return route (RR1) and a GBR service of 0.4 Mbit/s for a second return route (RR2). These data are retrieved 34 from the database 5. In addition, the quality-of-service data for the forward route FR2 previously selected at the client 6 is validated 36 with the current data stored in the database 5. In the example of FIG. 5, the validation 36 yields that the GBR commitment of 0.5 Mbit/s held in the cache 5 is in fact not valid anymore and the current GBR for FR2 is 0.4 Mbit/s. This is additionally included into the third response 38 and transmitted to the client 6.

The client 6 may then make a routing selection for uploading and/or downloading Linux distribution data to the selected mirror server based on the network routing and quality-of-service data retrieved from the database system 2.

Finally, FIG. 6 is a diagrammatic representation of a computer system 100 which provides the functionality of the database system 2 as shown in FIG. 1, implementing the activities/functions as described above including e.g. hosting the cache 4 and the database 5. Within the database system 2, a set of instructions 110, to cause the computer system 100 to perform any of the methods discussed herein, may be executed. The database system 2 includes at least one processor 102 (implementing the computation nodes 6 as explained above), a main memory 104 and a network interface device 108. The main memory 104 includes a user space 104', which is associated with user-run applications, and a kernel space 104", which is reserved for an operating system, as well as operating-system- and hardware-associated applications. The computer system components 102 to 109 are interconnected by a data bus 101 (implementing the interface 8). Optionally, it may further include a static memory 106, e.g. non-removable flash and/or solid-state drive and/or a removable Micro or Mini SD card, which permanently stores software enabling the computer system 100 to execute functions of the computer system 100 and an additional I/O interface 109, such as card reader and USB interfaces may be present. A video display 103, a user interface control module 107 and/or an alpha-numeric input device 105. The network interface device 108 connects the database system 2 to other stations, including the clients 6, the Internet and/or any other network. Computer system 100 may also represent only a portion of the database system 2 in the case the database system 2 is distributed across several computer systems 100 interconnected by a network via the network interface device 108. A set of instructions (i.e. software) 110 embodying any one, or all, of the methods described above, resides completely, or at least partially, in or on a machine-readable medium, e.g. the main memory 104 and/or the processor 102. The software 110 may further be transmitted or received as a propagated signal 111 via the Internet through the network interface device 108.

In general, the routines executed to implement the embodiments of the invention, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used, such terms are intended to be inclusive in a manner similar to the term "comprising".

While all of the invention has been illustrated by a description of various embodiments and while these embodiments have been described in considerable detail, it is not the intention to restrict or in any way limit the scope to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

The invention claimed is:

1. A method for processing data queries, the method being performed by a database system which comprises:
a database configured to store current data which is continuously updated; and
a cache configured to store cached data corresponding to at least a subset of the current data stored in the database; and
the method comprising, at the database system:
in response to receiving a first query comprising a first set of search parameters that specify data to be retrieved, returning a first set of cached data in accordance with the first set of search parameters from the cache;
in response to receiving a second query related to the first query, the second query comprising a second set of search parameters that specify data to be retrieved and indicating a subset of the first set of cached data, returning a second set of cached data in accordance with the second set of search parameters from the cache;
in response to receiving a third query related to the second query, the third query comprising a third set of search parameters that specify data to be retrieved indicating a subset of the second set of cached data;
retrieving a third set of current data in accordance with the third set of search parameters from the database;
validating the subset of the second set of cached data with the current data stored in the database; and
returning the third set of current data in accordance with the third set of search parameters and the validated subset of the second set of cached data.

2. The method of claim 1, further comprising:
in response to receiving the second query, directing the second query to the cache for retrieving the second set of cached data;
in response to receiving the third query, determining that the third query is related to the second query; and
in response to determining that the third query is related to the second query, directing the third query to the database.

3. The method of claim 2, further comprising:
receiving the second set of cached data from the cache;
sending a first response message with the second set of cached data to a querying client;
receiving the third set of current data and the validated subset of the second set of cached data from the database; and
sending a second response message with the third set of current data and the validated subset of the second set of cached data to the querying client.

4. The method of claim 1, wherein validating the subset of the second set of cached data with the current data stored in the database comprises:

determining that the current data stored in the database corresponding to the subset of the second set of cached data is identical to the subset of the second set of cached data; and returning an indicator of validity as the validated subset of the second set of cached data.

5. The method of claim 1, wherein validating the subset of the second set of cached data with the current data stored in the database comprises:

determining that the current data stored in the database corresponding to the subset of the second set of cached data is different from the subset of the second set of cached data; and returning a determined difference between the second set of cached data and the current data stored in the database corresponding to the subset of the second set of cached data as the validated subset of the second set of cached data.

6. The method of claim 1, wherein the cache and the database are configured to store data about a communication network infrastructure including a plurality of network nodes of a communication network, a plurality of links between the network nodes of the communication network, and technical information about the network nodes and the links, and wherein the first query, the second query, and the third query are part of a network routing request, and wherein the first set of search parameters of the first query specify network node characteristics of a potential target network node with which to communicate, and the first set of cached data comprises identification information and characteristics information of a number about the network nodes fulfilling the network node characteristics of the potential target network node;

the second set of search parameters of the second query comprises an identification of a target network node of the number of the network nodes and the second set of cached data comprises identification information and technical information about a number of forward network routes from a source network node to the target network node via the links; and the third set of search parameters comprises an identification of a forward network route of the number of forward network routes from the source network node to the target network node via the links and the third set of current data comprises identification information and technical information about a number of reverse network routes from the target network node to the source network node via the links.

7. A database system for processing data queries, the database system comprising:

a database configured to store current data which is continuously updated;

a cache configured to store cached data corresponding to at least a subset of the current data stored in the database;

at least one processor; and at least one memory containing instructions that, when executed by the at least one processor, cause the database system to perform operations comprising:

in response to receiving a first query comprising a first set of search parameters that specify data to be retrieved, return a first set of cached data in accordance with the first set of search parameters from the cache;

in response to receiving a second query related to the first query, the second query comprising a second set of search parameters that specify data to be retrieved and indicating a subset of the first set of cached data, return a second set of cached data in accordance with the second set of search parameters from the cache;

in response to receiving a third query related to the second query, the third query comprising a third set of search parameters that specify data to be retrieved indicating a subset of the second set of cached data, retrieve a third set of current data in accordance with the third set of search parameters from the database;

validate the subset of the second set of cached data with the current data stored in the database; and return the third set of current data in accordance with the third set of search parameters and the validated subset of the second set of cached data.

8. The database system of claim 7, wherein the operations further comprise:

in response to receiving the second query, direct the second query to the cache for retrieving the second set of cached data;

in response to receiving the third query, determine that the third query is related to the second query; and in response to determining that the third query is related to the second query, direct the third query to the database.

9. The database system of claim 8, wherein the operations further comprise:

receive the second set of cached data from the cache;

send a response message with the second set of cached data to a querying client;

receive the third set of current data and the validated subset of the second set of cached data from the database; and send a response message with the third set of current data and the validated subset of the second set of cached data to the querying client.

10. The database system of claim 7, wherein the operation to validate the subset of the second set of cached data with the current data stored in the database comprises:

determine that the current data stored in the database corresponding to the subset of the second set of cached data is identical to the subset of the second set of cached data; and return an indicator of validity as the validated subset of the second set of cached data.

11. The database system of claim 7, the operation to validate the subset of the second set of cached data with the current data stored in the database comprises:

determining that the current data stored in the database corresponding to the subset of the second set of cached data is different from the subset of the second set of cached data;

determine a difference between the second set of cached data and the current data stored in the database corresponding to the subset of the second set of cached data; and returning the determined difference as the validated subset of the second set of cached data.

12. The database system of claim 7, wherein the cache and the database are configured to store data about a communication network infrastructure including a plurality of network nodes of a communication network, a plurality of links between the network nodes of the communication network, and technical information about the network nodes and the links, and wherein the first query, the second query, and the third query are part of a network routing request, and wherein the first set of search parameters of the first query specify network node characteristics of a potential target network node with which to communicate, and the first set of cached data comprises identification information and characteristics information of a number about the network nodes fulfilling the network node characteristics of the potential target network node;

the second set of search parameters of the second query comprises an identification of a target network node of the number of the network nodes and the second set of cached data comprises identification information and technical information about a number of forward network routes from a source network node to the target network node via the links; and the third set of search parameters comprises an identification of a forward network route of the number of forward network routes from the source network node to the target network node via the links and the third set of current data comprises identification information and technical information about a number of reverse network routes from the target network node to the source network node via the links.

13. A non-transitory computer-readable storage medium comprising instructions that upon execution by a processor of a computing device cause the computing device to process data queries, wherein the instructions comprise:

in response to receiving a first query comprising a first set of search parameters that specify data to be retrieved, return a first set of cached data in accordance with the first set of search parameters from a cache;

in response to receiving a second query related to the first query, the second query comprising a second set of search parameters that specify data to be retrieved and indicating a subset of the first set of cached data, return a second set of cached data in accordance with the second set of search parameters from the cache;

in response to receiving a third query related to the second query, the third query comprising a third set of search parameters that specify data to be retrieved indicating a subset of the second set of cached data;

retrieve a third set of current data in accordance with the third set of search parameters from a database;

validate the selected subset of the second set of cached data with current data stored in the database; and return the third set of current data in accordance with the third set of search parameters and the validated subset of the second set of cached data.

* * * * *